United States Patent [19]

Denoel

[11] Patent Number: 4,891,083
[45] Date of Patent: Jan. 2, 1990

[54] METHOD FOR PRODUCING A LAMINATED COMPOSITE STRUCTURE INCLUDING TUBULAR BRAIDED REINFORCEMENT

[75] Inventor: Jean D. Denoel, Valence, France

[73] Assignee: Societe Anonyme:Societe Europeenne de Propulsion, Suresnes, France

[21] Appl. No.: 224,742

[22] Filed: Jul. 27, 1988

Related U.S. Application Data

[62] Division of Ser. No. 35,659, Mar. 26, 1987, Pat. No. 4,780,346.

[30] Foreign Application Priority Data

Mar. 28, 1986 [FR] France .................... 86 04531

[51] Int. Cl.$^4$ ............................................. B32B 1/08
[52] U.S. Cl. ........................................ 156/148; 87/9; 138/173; 156/198; 156/227
[58] Field of Search ............... 156/148, 149, 166, 180, 156/194, 198, 204, 205, 209, 227, 210; 264/137, 282, 285, 286; 428/176, 265; 87/1, 9, 11, 13; 138/121, 173; 60/200.1

[56] References Cited

U.S. PATENT DOCUMENTS

| | | | |
|---|---|---|---|
| 2,078,549 | 4/1937 | Wheeler | 156/194 |
| 2,836,181 | 5/1958 | Tapp | 87/9 X |
| 3,299,417 | 1/1967 | Sibthorpe | 138/121 |
| 3,409,224 | 11/1968 | Harp et al. | |
| 3,908,704 | 9/1975 | Clement et al. | 138/121 |
| 4,144,632 | 3/1979 | Stroupe | 156/194 X |

FOREIGN PATENT DOCUMENTS

| | | | |
|---|---|---|---|
| 1491106 | 6/1967 | France . | |
| 0334440 | 9/1930 | United Kingdom | 156/494 |
| 561544 | 5/1944 | United Kingdom . | |

Primary Examiner—Michael W. Ball
Assistant Examiner—David William Herb
Attorney, Agent, or Firm—Lowe, Price, LeBlanc, Becker & Shur

[57] ABSTRACT

A method for producing a laminated composite structure is provided, the structure including a tubular reinforcement braid, of which the wall is folded over to form corrugations of wrinkles which constitute layers of fibrous material superposed in axial direction, each layer extending from the inside surface to the outside surface of the structure.

10 Claims, 1 Drawing Sheet

METHOD FOR PRODUCING A LAMINATED COMPOSITE STRUCTURE INCLUDING TUBULAR BRAIDED REINFORCEMENT

This is a division, of application Ser. No. 035,659, filed Mar. 26, 1987, now U.S. Pat. No. 4,780,346.

FIELD OF THE INVENTION

The present invention relates to a method for producing a tubular laminated structure, and, more particularly, to a method for producing a structure comprising layers of fibrous material, superposed in axial direction, each layer extending from the inside surface to the outside surface of the structure such as for example ablative thermal protection for solid propellant rocket motors.

BACKGROUND OF THE PRIOR ART

Various processes are already known for producing reinforcing preforms for axi-symmetrical pieces in composite material.

One of these processes consists in stalking rings of fibrous material and optionally bonding them together, for example by needling, in order to produce a preform which is thereafter densified to obtain the desired axi-symmetrical piece. This process is suitable for producing pieces of relatively small thickness, such as brake discs, but it is not particularly suitable when the pieces to be produced have a greater axial dimension.

Another known process consists in winding on a mandrel yarns, tapes or strips of fibrous material in superposed layers. The layers may be bonded together in different ways, such as by needling or sewing or by means of pins implanted on the surface of the mandrel, either so as to actually produce radial bonding of the elements, or to provide a passage for radial reinforcing elements which are inserted after the winding operation.

OBJECT AND SUMMARY OF THE INVENTION

The object of the present invention is to provide a novel method which enables the production of composite pieces of any axial dimension, with an increased resistance to ablation, particularly when the pieces are subjected to high temperature gas flows.

This object is realized with a process which, according to the invention, consists in using a tubular braid and folding its wall so as to form corrugations or wrinkles which constitute the layers of fibrous material superposed in an axial direction.

It is possible, due to the deformability of the braid, to obtain a structure in which the layers can have any required orientation with respect to the axis of the structure. In particular, in the case of an application for the production of composite thermal protections, the resistance to ablation may be improved by a "sleek-hair" orientation of the fibers with respect to the gas flow.

Moreover, in each corrugation or wrinkle, the fibers extend from the inside to the outside of the tubular structure. Thus, even if the inside part of said structure is attacked by an intensely high temperature gas flow, the cold outside part of the fibers remains firmly embedded and the orientation thereof helps the discharge of the pyrolysis gases, resulting from the degradation of the inside part, without delamination of the structure.

The invention will be more readily understood on reading the following description with reference to the accompanying drawings.

DETAILED DESCRIPTION OF THE PREFERRED EMBODIMENT

Figure 1:
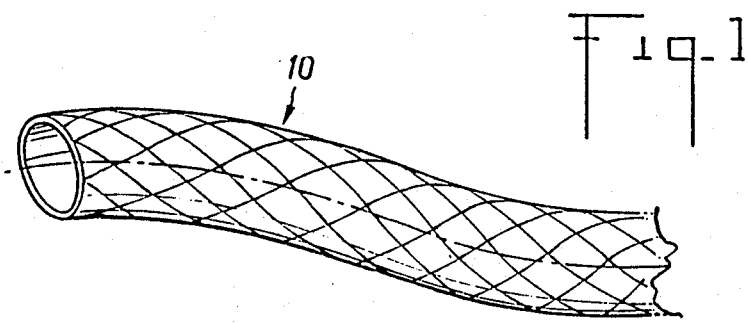
FIG. 1 is a diagrammatical view of a tubular reinforcement braid suitable for carrying out the process according to the invention.
Figure 2:
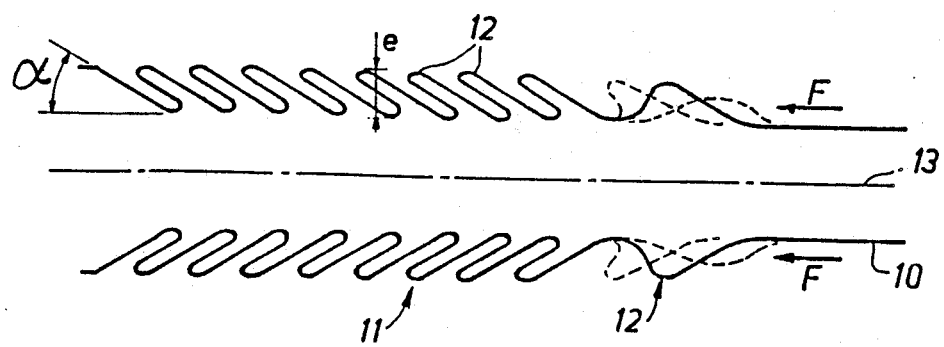
FIG. 2 illustrates diagrammatically the formation of a tubular structure with a braid such as that illustrated in FIG. 1.

Referring first to FIG. 1, this shows a tubular braid 10 which constitutes the starting element for the preparation of a structure according to the process of the invention. As illustrated in FIG. 2, the desired structure 11 is produced by just folding the braid over itself by a translational movement parallel to its own axis (arrows F) so as to form corrugations or wrinkles 12. These wrinkles 12 are applied against one another and form layers which are superposed in the axial direction, with each layer extending from the inside surface to the outside surface of the structure 11.

In the illustrated example, wrinkles 12 are arranged slantwise, meaning that they form an angle $\alpha$ with axis 13 of the structure 11, said angle $\alpha$ being variable between a few degrees and 90°. The amplitude of the corrugations or wrinkles 12, determines, for a selected angle $\alpha$, the thickness e of the corrugated structure 11, namely the distance between the inside surface and the outside surface thereof.

Depending on the geometrical properties of the braid, e.g., diameter, angles formed by the rows constituting the braid, and the like and making use of its ability to deform, it is possible to obtain a structure in which angle $\alpha$ and thickness e can be adjusted at will. For example, angle $\alpha$ can be made equal to 90°, i.e., with wrinkles 12 perpendicular to axis 13.

The process according to the invention is applicable to the preparation of tubular structures of which the cross-section is not necessarily circular, and for which the center of gravity of the cross-section is not necessarily on a straight line. Thickness e can also be made to vary along the axis of structure 11, by modifying the amplitude and/or the inclination of the wrinkles 12.

As already indicated, the invention is particularly suitable for the production of tubular structures constituting fibrous reinforcing preforms for the making of pieces of composite materials; in particular, ablative pieces.

The material constituting the tubular braid 10 is selected in light of the intended purpose of the structure. In the case of a reinforcement for a composite piece destined to withstand high thermal stresses, the selected braid will preferably be produced from refractory fibers or precursors thereof, such as for example a braid containing pre-oxidized PAN (polyacrylonitrile) fibers, this material being a carbon precursor. The braid is produced with the selected fibers by any of the conventional processes for producing tubular braids.

The tubular structure obtained after folding over of the tubular braid may be reinforced, for example by being subjected to a needling operation, the needling being carried out crosswise with respect to the wrinkles 12. Thereafter, in order to obtain the target composite piece, the structure is densified by through-deposition or infiltration, of a matrix-forming material such as a thermo-setting resin, carbon or other refractory material, for example of ceramic type. Various densifying methods may be used, such as the chemical vapor infiltration method, or the liquid impregnation followed by a heat treatment or else an infiltration preceded by a pre-impregnation. The material constituting the matrix, like the material constituting the reinforcing structure, is selected to suit the the desired application. It may be resin, pyrolytic carbon or another refractory material such as silicon carbide deposited by chemical vapor deposition, according to any known technique.

The structure obtained according to the invention is well adapted to the production of thermal protection elements, particularly for the rear extensions of solid propellent rocket motors, since the resistance to ablation caused by the flow of high temperature combustion gases may be substantially increased due to a "sleek-hair" orientation of the wrinkles 12, and hence of the fibers of the structure 11. Moreover, in each wrinkle 12 the fibers start from the inside surface of the structure and extend to the outside surface. Thus, when the hot inside part of the structure becomes degraded due to the hot gas flow, the fibers located in that part remain embedded in the cold outside part and the pyrolysis gases can easily escape towards the inside of the tube without affecting its resistance.

Obviously, the process according to the invention is not limited to the production of reinforcing structures for ablative composite pieces, but can be applied to all cases in which a tubular reinforcing structure has to be prepared, provided that the necessary braid exists is used to suit the application at hand.

What is claimed is:

1. A method for forming a composite-laminated structure containing tubular braided-reinforcement, comprising the steps of:
   folding a length of tubularly braided reinforcement material into a plurality of superposed corrugations applied against one another at a predetermined frequency along an axial direction of said length, the braided corrugated material thereby being formed into wrinkles providing a plurality of superimposed layers each of a predetermined amplitude radially of the axial direction and extending from an inside surface to an outside surface of the resultant corrugated shape; and
   densifying the folded braided reinforcement material by controllably applying thereto a selected densifying material to bond with said braided material to form a composite matrix providing a reinforced, generally tubular resultant structure.

2. The method according to claim 1, wherein:
   said wrinkles are disposed slantwise at a predetermined inclination with respect to an axis of the resultant structure.

3. The method according to claim 1, wherein:
   said wrinkles vary in frequency along an axis of the resultant structure in order to give a predetermined variable radial thickness thereto.

4. The method according to claim 1, comprising the further step of:
   reinforcing said folded braided reinforcement material by needling the same prior to said step of densifying the resultant needled structure.

5. The method according to claim 1, wherein:
   said braided reinforcement material and said densifying material are selected to provide a composite tubular structure having ablative resistance to hot gas flow there through.

6. The method according to claim 2, wherein:
   said predetermined inclination ranges from a few degrees to 90° with respect to said axis of said resultant structure.

7. The method according to claim 6, comprising the further step of:
   reinforcing said folded braided reinforcement material by needling the same prior to said step of densifying the resultant needled structure.

8. The method according to claim 7, wherein:
   said braided reinforcement material and said densifying material are selected to provide a composite tubular structure having ablative resistance to hot gas flow therethrough.

9. A method for forming a braid-reinforced, tubular, composite-laminated structure, comprising the steps of:
   folding a length of tubularly-braided reinforcement material to form corrugations along an axial direction of said length, the braided corrugated material being formed into superimposed layers each of a predetermined amplitude radially of the axial direction and extending from an inside surface to an outside surface of the resultant corrugated shape;
   needling the corrugations together in their crosswise direction so as to reinforce the tubular structure; and
   densifying the needled braided reinforcement material by controllably applying a selected densifying material in known manner for bonding thereto to thereby form a composite, reinforced, generally tubular structure.

10. The method according to claim 9, wherein:
    said braided reinforcement material and said densifying material are selected to provide a composite tubular structure having ablative resistance to hot gas flow there through.

* * * * *